United States Patent
Raley

(10) Patent No.: US 6,627,840 B2
(45) Date of Patent: Sep. 30, 2003

(54) METHOD AND MEANS FOR PROCESSING BUTT WELDS

(75) Inventor: Jimmie C. Raley, Yellville, AR (US)

(73) Assignee: Revelation Technologies, LLC, Harrison, AR (US)

( * ) Notice: Subject to any disclaimer, the term of this patent is extended or adjusted under 35 U.S.C. 154(b) by 0 days.

(21) Appl. No.: 09/803,533

(22) Filed: Mar. 9, 2001

(65) Prior Publication Data

US 2002/0125301 A1 Sep. 12, 2002

(51) Int. Cl.⁷ .................... B23K 9/02; B23K 11/00; B23K 9/12
(52) U.S. Cl. ............ 219/101; 219/124.21; 219/78.01; 219/78.15; 219/60.2; 219/158; 228/125; 29/33 A
(58) Field of Search ................... 219/158, 101, 219/105, 106, 64, 59.1, 60.2, 78.01, 78.15, 124.4; 29/33; 228/125

(56) References Cited

U.S. PATENT DOCUMENTS

| | | | |
|---|---|---|---|
| 3,438,561 A | | 4/1969 | Calton ............... 228/13 |
| 3,592,103 A | * | 7/1971 | Brown .............. 228/125 |
| 3,662,941 A | | 5/1972 | Gage ................. 228/2 |
| 3,768,293 A | * | 10/1973 | Ruesch ............. 29/33 Q |
| 3,808,393 A | * | 4/1974 | Goodwin et al. ...... 219/101 |
| 3,996,780 A | * | 12/1976 | German ............. 72/187 |
| 4,063,061 A | * | 12/1977 | Fujino et al. ....... 219/101 |
| 4,251,175 A | * | 2/1981 | Hara et al. ......... 219/105 |
| 4,272,003 A | | 6/1981 | Oishibashi et al. ... 228/13 |
| 4,353,236 A | * | 10/1982 | Byrd ............... 228/125 |
| 4,373,297 A | * | 2/1983 | Pennertz et al. ..... 15/77 |
| 4,406,029 A | * | 9/1983 | Kunz ............... 15/77 |
| 4,543,022 A | * | 9/1985 | Bonner ............. 409/139 |
| 5,528,830 A | * | 6/1996 | Hansen ............. 30/101 |
| 5,539,973 A | * | 7/1996 | Smith et al. ....... 29/33 F |
| 5,698,118 A | * | 12/1997 | Takeda et al. ...... 219/105 |
| 5,709,585 A | * | 1/1998 | Matsuo et al. ...... 451/211 |
| 6,015,334 A | * | 1/2000 | Hundeb.o slashed.l .. 451/28 |
| 6,195,859 B1 | * | 3/2001 | Katsura et al. ..... 29/33 A |
| 6,367,684 B1 | * | 4/2002 | Hoffmann et al. .... 101/217 |
| 2001/0013533 A1 | * | 8/2001 | Ohnishi et al. ..... 72/187 |

FOREIGN PATENT DOCUMENTS

JP    01-171714 A  *  7/1989
JP    06-39540 A   *  5/1997

* cited by examiner

Primary Examiner—Tom Dunn
Assistant Examiner—L. Edmondson
(74) Attorney, Agent, or Firm—Thomte, Mazour & Niebergall; Dennis L. Thomte

(57) ABSTRACT

A method and machine for deburring the burr which is formed when wires are butt welded is disclosed. The machine comprises a deburring head which has a pair of opposed deburring rollers mounted thereon. Each of the rollers has a milled surface formed therein. A linkage is connected to the rollers to cause the rollers to rotate when the linkage is moved between first and second positions. When the linkage is in its first position, the milled surfaces of the rollers face one another to enable the wires and burr to be positioned therebetween. As the linkage moves to its second position, the circumferences of the rollers engage the burr to roll out the same, thereby providing a substantially smooth, cylindrical surface where the burr was located. The method of deburring is also disclosed.

16 Claims, 4 Drawing Sheets

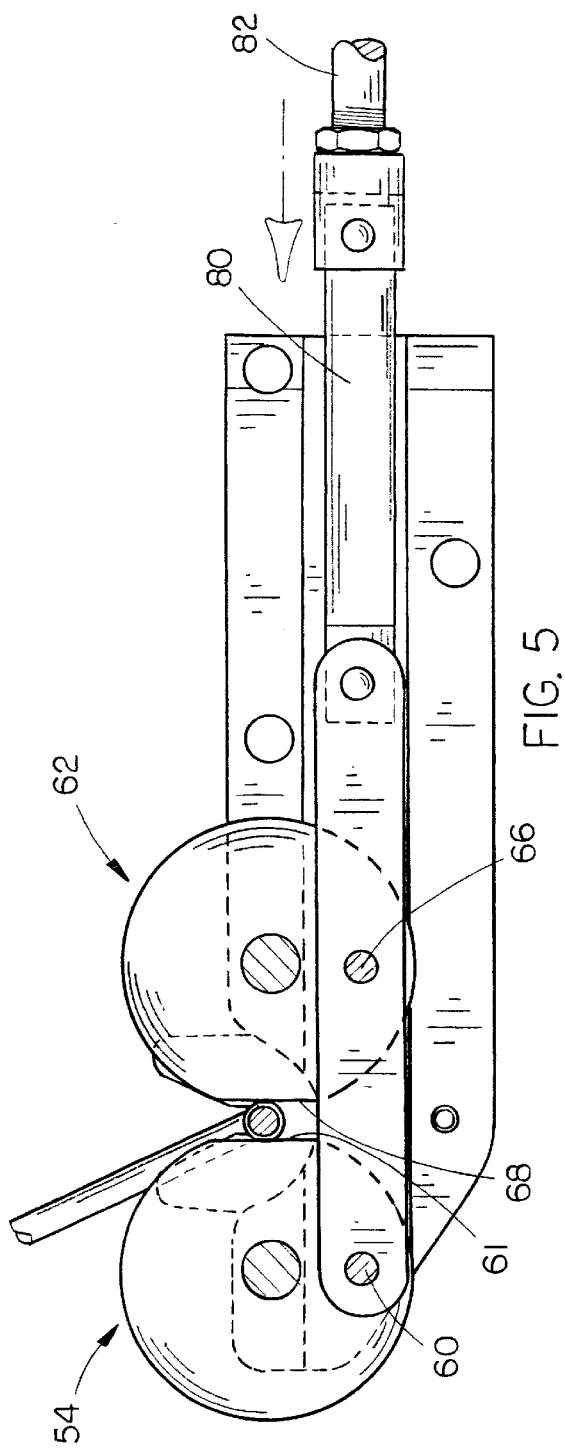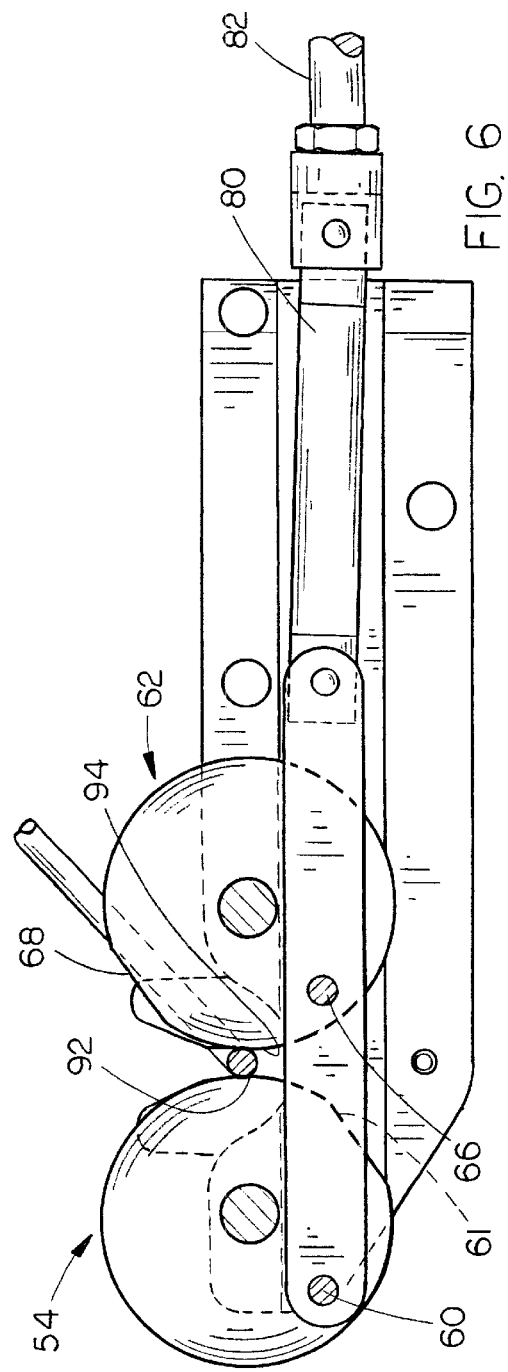

METHOD AND MEANS FOR PROCESSING BUTT WELDS

BACKGROUND OF THE INVENTION

1. Field of the Invention

This invention relates to a method of processing or deburring a butt weld so that a smooth, cylindrical surface is achieved where the burr was located. This invention also relates to an apparatus which deburrs the butt weld.

2. Description of the Related Art

When wires are butt welded, an annular burr or nugget is created. In most cases, it is desirable and necessary to remote the burr so that a smooth, cylindrical surface is obtained where the wires were butt welded. Heretofore, to the best of applicant's knowledge, the customary methods of removing the burr from the butt weld were to grind the burr or to hammer the burr. The grinding and/or hammering methods are time-consuming and require that the butt welded pieces be transferred from the person performing the butt welding operation to a person who will perform the grinding or hammering operation. The above methods generate a loss in profits through additional employee salaries and interruptions created in the production cycle.

SUMMARY OF THE INVENTION

A method and means is described for processing butt welds. More particularly, a method and means is provided for deburring the burr which results when wires are butt welded together. The machine of this invention comprises a deburring head which has a pair of opposing deburring rollers rotatably mounted thereon. A linkage interconnects the deburring rollers to cause the rollers to be rotated as the linkage is reciprocated between first and second positions with respect to the deburring head by means of an air cylinder operatively connected to the linkage. Each of the rollers has a milled surfaced formed on the circumference thereof. The milled surfaces of the rollers face one another when the linkage is in its first position to enable the wires having the burr thereon to be positioned between the deburring rollers. As the linkage moves from its first position to its second position and from its second position to its first position, the circumferences of the rollers engage the burr to roll out the same, thereby creating a substantially smooth cylindrical surface where the burr was located.

It is therefore a principal object of the invention to provide an improved method and means for processing a butt weld.

A further object of the invention is to provide an improved method and means for deburring a butt weld burr.

A further object of the invention is to provide a method and means for deburring a butt weld which eliminates the need for grinding or hammering the burr.

Yet another object of the invention is to provide a method and means for processing a butt weld which reduces the cost thereof.

Yet another object of the invention is to provide a method and means for processing a butt weld which eliminates the need for separate grinding and/or hammering steps.

Still another object of the invention is to provide a method and means for processing a butt weld which eliminates breaks or interruptions in the production cycle.

These and other objects will be apparent to those skilled in the art.

BRIEF DESCRIPTION OF THE DRAWINGS

FIG. 5 is a partial side elevational view of the deburring machine as the butt welded wires are initially positioned in the deburring machine;

FIG. 6 is a view similar to FIG. 5 except that the deburring rollers have been rotated to remove the burr from the butt weld.

DESCRIPTION OF THE PREFERRED EMBODIMENT

Figure 2:
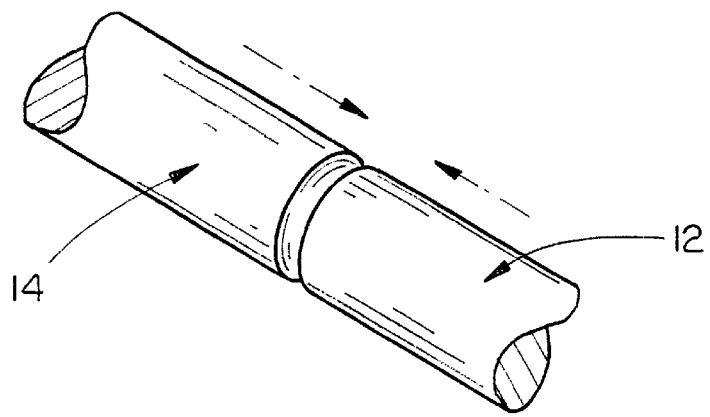
FIG. 2 is a perspective view illustrating two wires being moved towards one another for butt welding the wires together.
Figure 3:
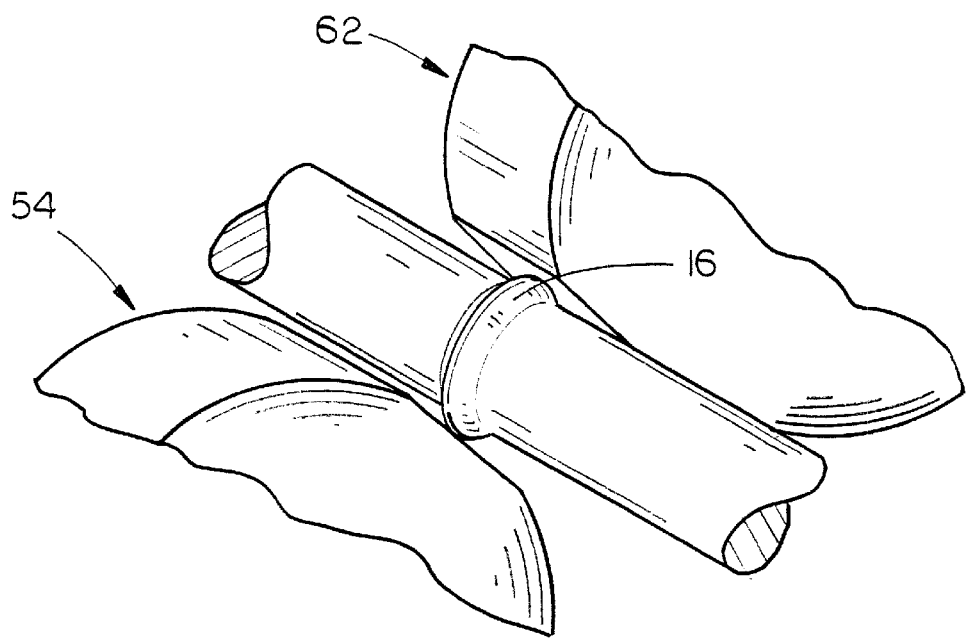
FIG. 3 is a front perspective view illustrating the butt welded wires being initially positioned in the deburring machine.
Figure 4:
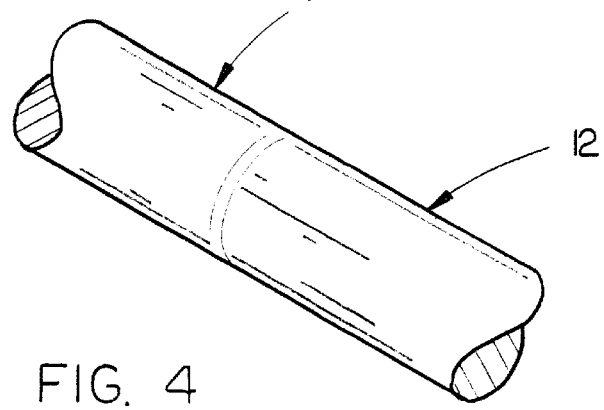
FIG. 4 is a perspective view of the deburred butt welded wires.

The deburring machine of this invention is referred to generally by the reference numeral 10 while the numerals 12 and 14 refer to wires which are to be butt welded together. When the wires 12 and 14 are to be butt welded, the ends of the wires 12 and 14 are moved together in conventional fashion, as illustrated in FIG. 2, and are butt welded together in conventional fashion. When the wires 12 and 14 are butt welded, an annular burr 16 is formed which extends around the area of the butt weld.

Deburring machine 10 includes a deburring head 18 which is conveniently mounted on a support pedestal 20 or some other supporting structure. Machine 10 is preferably positioned closely adjacent the butt welding station so that the person performing the butt welding operation may conveniently remove the butt welded wires from the welding machine and place the butt welded wires in the machine 10 in a convenient manner while the butt weld burr 16 is still in a malleable state from the welding operation. Deburring head 18 includes side frames 22 and 22'. Inasmuch as side frames 22 and 22' are identical, but mirror images of one another, only side frame 22 will be described in detail with "'" indicating identical structure on side frame 22'. Side frame 22 includes a forward end 26, a rearward end 28, an upper end 30, a lower end 32, an outer side 34, and an inner side 36. The upper end of side frame 22 is provided with a U-shaped recess 38 formed therein adjacent the forward end thereof. Plate 40 is secured to the outer side 34 of side frame 22 and has a V-shaped opening 42 formed therein which extends downwardly thereto and which communicates at its lower end with a U-shaped slot 44 which extends downwardly therefrom. Plate 40 is secured to side frame 22 by a plurality of cap screws 46.

Figure 7:
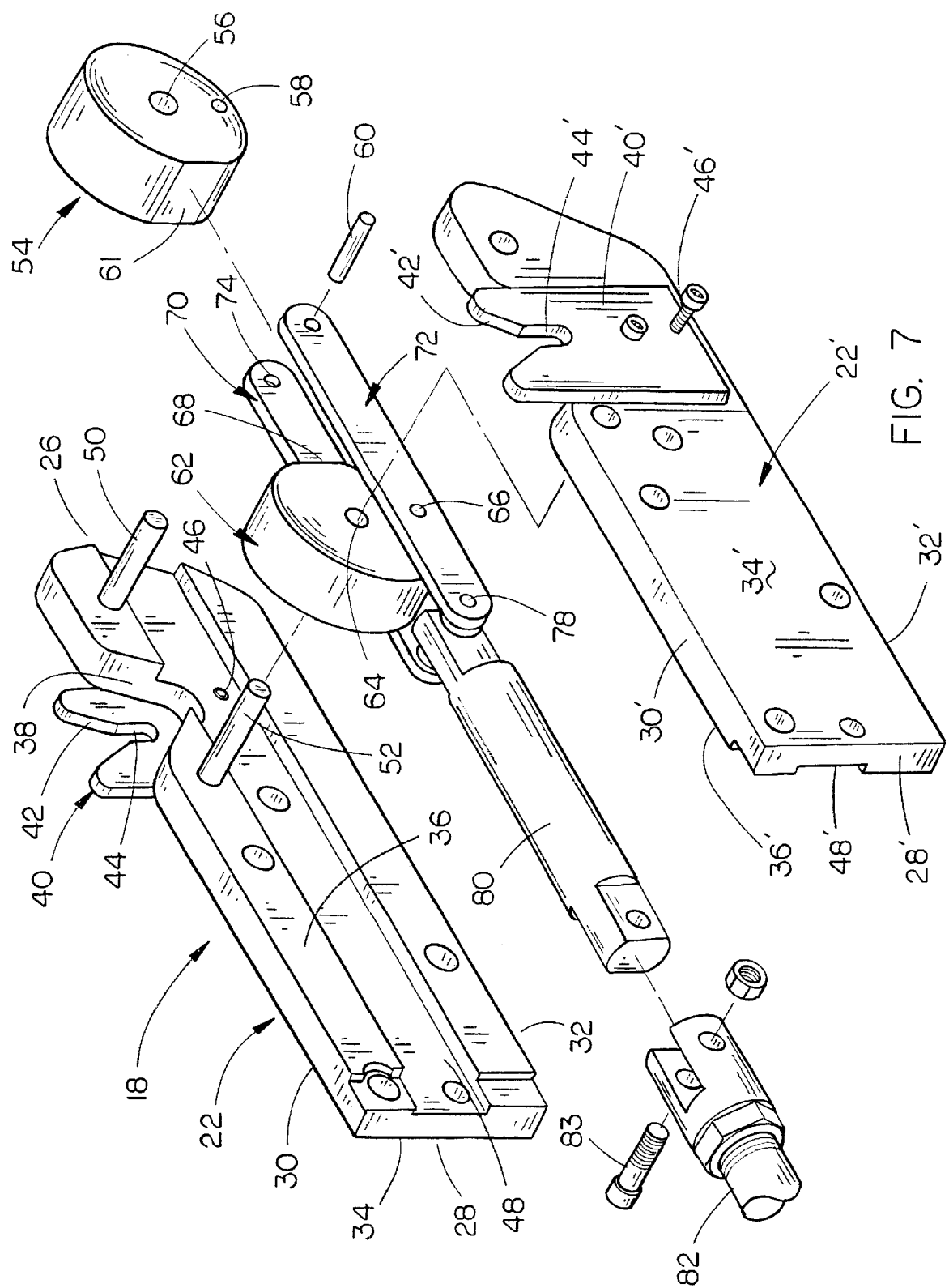
FIG. 7 is an exploded perspective of the deburring head of the deburring machine.

An elongated slot or channel 48 is formed in the inner side 36 of side frame 22 and extends between the forward and rearward ends thereof, as seen in FIG. 7. Pins 50 and 52 are mounted in and extend between side frames 22 and 22'. Deburring roller 54 is rotatably mounted on pin 50 by means of pin 50 rotatably extending through the bore 56 which extends through the central rotational axis of roller 54. Roller 54 also has a bore 58 formed therein which is adapted to receive pin 60 therein. Pin 60 is press-fitted in bore 58 to prevent rotation of pin 60 therein. The circumference of roller 54 is provided with a milled surface 61 formed therein. Deburring roller 62 is rotatably mounted on pin 52 by means of pin 52 rotatably extending through the bore 64 which extends through the central rotational axis of roller 62. Roller 62 also has a bore extending therethrough which has pin 66 mounted therein which is press-fitted therein to prevent rotation of pin 66 with respect to roller 62. The circumference of roller 62 is provided with a milled surface 68 formed therein.

Elongated links 70 and 72 are positioned on opposite sides of rollers 54 and 62 and are movably received by channels 48 and 48' respectively formed in the inner sides of side frames 22 and 22'. The forward ends of links 70 and 72 have openings 74 and 76 formed therein, respectively, which rotatably receive the opposite ends of pin 60. The rearward ends of links 70 and 72 have openings formed therein which receive the opposite ends of pin 78. Links 70 and 72 have openings formed therein forwardly of the rearward ends thereof which rotatably receive the opposite ends of pin 66.

Connector rod 80 has its forward end rotatably or pivotally mounted on pin 78 between links 70 and 72. The rearward end of rod 80 is adjustably connected to rod 82 by bolt assembly 83. Rod 82 extends from a power cylinder such as an air cylinder 84, hydraulic cylinder, electric motor and gears, or the like, to enable rod 80 to be reciprocated forwardly and rearwardly between side frames 22 and 22'. Normally, the air cylinder 84 connected to the rod 80 will be controlled by a foot pedal which is electrically connected to switch 85 which controls the operation of the air cylinder 84 through the electric valve 86.

Figure 1:
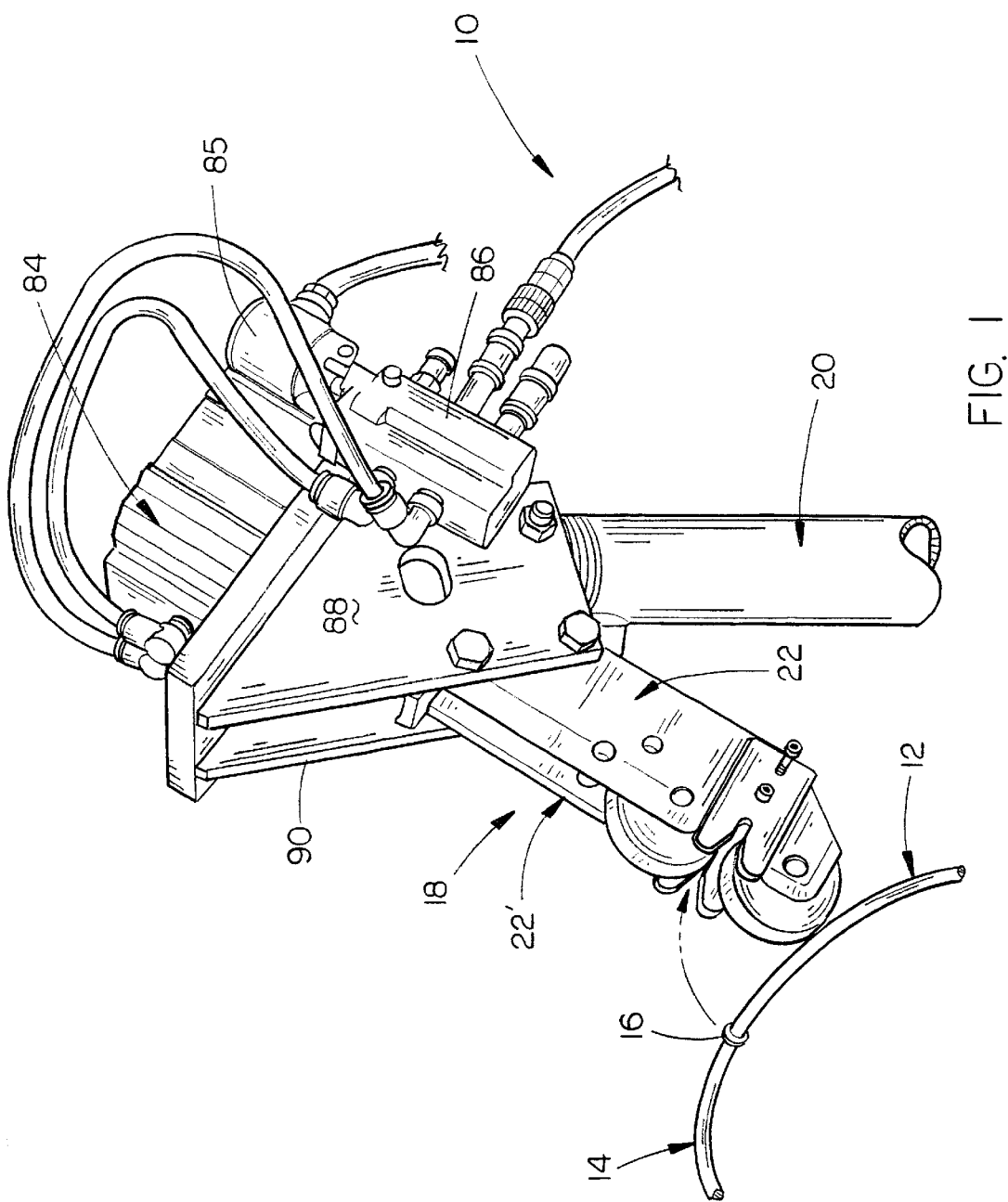
FIG. 1 is a partial front perspective view of the deburring machine of this invention.

The rearward ends of side frames 22 and 22' are positioned between plates 88 and 90 of support 91 with support 91 being mounted on the pedestal 20. The air cylinder 84, switch 85 and valve 86 are mounted on support 91, as seen in FIG. 1.

In operation, with the deburring machine 10 positioned closely adjacent the butt welding station so that the operator of the butt welding station may perform the butt welding operation, and operate the machine 10 as well, the deburring operation is as follows. In the rest (first) position, as illustrated in FIG. 5, the milled surfaces 61 and 68 of the deburring rollers 54 and 62 face one another, thereby providing sufficient clearance between the rollers 54 and 62 to permit the butt weld burr 16 of wires 12 and 14 to be inserted between the rollers 54 and 62. The distance between the rollers 54 and 62 may be manually changed or automatically changed to accommodate wires of different gauges or diameters. The butt weld burr 16 and the ends of the wires 12 and 14 will be removed from the welding station by the welding operator and the wires 12 and 14 will be immediately inserted downwardly through the V-shaped openings 42 and 42' and into the U-shaped slots 44 and 44' until the wires 12 and 14 are positioned in the lowermost portions of slots 44 and 44'. The burr 16 will be centered between the milled surfaces 61 and 68 at this time. The operator then activates the foot pedal which is electrically connected to switch 85 which then activates valve 86 which in turn causes the air cylinder 84 to extend the rod 82. The extension of the rod 82 causes the rod 80 and links 70 and 72 to move from the position of FIG. 5 to the position of FIG. 6 (second position). The forward movement of the links 70 and 72 causes the deburring rollers 54 and 62 to rotate in a clockwise direction, as viewed in FIG. 6. The clockwise rotation of rollers 54 and 62 by the links 70 and 72 causes milled surface 61 of roller 54 to move downwardly and forwardly while milled surface 68 of roller 62 moves upwardly and rearwardly, thereby bringing the circumference segments 92 and 94 of rollers 54 and 62, respectively, to engage burr 16 to "roll" out the burr 16 to create a smooth, cylindrical surface at the butt weld area.

When the rollers 54 and 62 have reached the position of FIG. 6 and the burr 16 has been at least partially rolled out, the operator then activates switch 85 through the foot pedal described above to cause air cylinder 84 to retract, thereby causing the rollers 54 and 62 to rotate to the position of FIG. 5 so that the milled surfaces 61 and 68 are facing one another to enable the wires 12 and 14, and the smooth cylindrical surface at the location of the butt weld, to be removed therefrom. As the rollers rotate from the second position to the first position, further rolling out of the burr 16 occurs if needed. In those cases where curved wires are being butt welded or where the ends of a wire ring are to be butt welded, the circumference segments 92 and 94 are preferably provided with a small radius thereacross to accommodate the curvature of the product being processed. Further, when rings are being deburred, one of the rollers 54 and 62 is preferably narrower than the other roller.

It should be noted that each of the rollers 54 and 62 do not have to be rotated 180 degrees to process the entire circumference of the burr 16, since the product will also rotate, as viewed in FIGS. 5 and 6, to process the entire circumference of the burr 16. It should also be noted that the radial location of the pin 60 with respect to the pin milled surface 61 should be slightly different than the radial location of the pin 66 with respect to the milled surface 68 so that the rollers 54 and 62 do not "lock up".

The process may be fully automatic from butt welder to deburring without an operator. Further, if the wire being deburred is large, the deburring head could be rotated around the wire if desired.

Thus it can be seen that a truly novel method and means has been provided for deburring a butt weld which accomplishes at least all of the objections of the invention. A single operator can butt weld the wires and deburr the burr created by the butt welding operation in a fast and efficient manner. The need for another employee to either grind the burr or hammer the burr is eliminated, thereby reducing the cost of deburring. Further, interruptions or breaks in the production cycle are eliminated.

Thus it can be seen that the invention accomplishes at least all of its stated objectives.

I claim:

1. A machine for deburring the burr formed when wires are butt welded together, comprising:

a support frame having a forward end, a rearward end, an upper end, a lower end, and first and second sides;

a vertically disposed first deburring roller rotatably mounted on said support frame, about a horizontal axis, adjacent said forward end thereof;

a vertically disposed second deburring roller rotatably mounted on said support frame rearwardly of said first deburring roller and being in alignment therewith;

said first deburring roller including a circumferential surface having a milled surface formed therein;

said second deburring roller including a circumferential surface having a milled surface formed therein;

a linkage interconnecting said first and second deburring rollers;

said linkage being rotatably connected to said first deburring roller between the center thereof and the circumferential surface thereof;

said linkage being rotatably connected to said second deburring roller between the center thereof and the circumferential surface thereof;

said linkage being selectively movable between first and second positions with respect to said support frame;

an actuator connected to said linkage for moving said link between its said first and second positions;

said first and second deburring rollers having the milled surfaces thereof facing one another, when said linkage is in its said first position, to permit the positioning of the wires and burr thereon between said first and second deburring rollers;

the movement of said linkage from its said first position to its said second position, when the wires and burr thereon are positioned between the milled surfaces, causing said first and second deburring rollers to rotate, thereby causing the circumferential surfaces on said first and second rollers, adjacent said milled surfaces thereon, to move into engagement with the burr to roll out the burr to create a substantially smooth, cylindrical surface where the burr was located;

the movement of said linkage from its said second position to its said first position, after the burr has been rolled out, causing said milled surfaces to again face one another to permit the deburred wire to be removed from between said first and second deburring rollers.

2. The machine of claim 1 wherein said linkage is rotatably connected to said deburring rollers adjacent the circumferential surface thereof.

3. The machine of claim 1 wherein said circumferential surfaces of said rollers have a radius formed therein to enable arcuate wires to be positioned therebetween.

4. The machine of claim 1 wherein said support frame is mounted upon a pedestal closely positioned to a butt welding station.

5. The machine of claim 1 wherein said support frame comprises first and second, horizontally spaced-apart and vertically disposed side frames having said deburring rollers rotatably mounted therebetween.

6. The machine of claim 5 wherein said first and second side frames have inner and outer surfaces, upper and lower ends, a forward end, and a rearward end, each of said inner surfaces of said side frames having an elongated channel formed therein which movably receives said linkage therein.

7. The machine of claim 6 wherein said linkage comprises first and second, elongated links positioned on opposite sides of said deburring rollers, said first link being movably received by said channel on said inner surface of said first side frame, said second link being movably received by said channel on said inner surface of said second side frame.

8. The machine of claim 5 wherein said first and second side frames have inner and outer surfaces, upper and lower ends, a forward end, and a rearward end; each of said first and second side frames having a recess formed therein which extends downwardly into the upper end thereof adjacent said forward end thereof for receiving the wires therein.

9. The machine of claim 8 wherein a guide plate is secured to each of said side frames at the outer surface thereof adjacent the said recess formed therein for guiding the wires into position between the deburring rollers.

10. The machine of claim 9 wherein each of said guide plates has upper and lower ends, and wherein a generally V-shaped opening extends downwardly thereinto.

11. The machine of claim 10 wherein a U-shaped opening is provided in each of said guide plates at the lower end of said V-shaped opening.

12. The machine of claim 1 wherein said actuator comprises an air cylinder which is operatively connected to said linkage.

13. The machine of claim 12 wherein a connector rod interconnects said linkage with said air cylinder.

14. The machine of claim 13 wherein said connector rod is movably positioned in said support frame.

15. The machine of claim 1 further including means for adjusting the distance between said rollers.

16. A machine for deburring the burr formed when wires are butt welded together, comprising:

a support frame having a forward end, a rearward end, an upper end, a lower end, and first and second sides;

a vertically disposed first deburring roller rotatably mounted on said support frame about a horizontal axis, adjacent said forward end thereof;

a vertically disposed second deburring roller rotatably mounted on said support frame rearwardly of said first deburring roller and being in alignment therewith;

said first deburring roller including a circumferential surface having a milled surface formed therein;

said second deburring roller including a circumferential surface having a milled surface formed therein;

a linkage interconnecting said first and second deburring rollers;

said linkage being rotatably connected to said first deburring roller between the center thereof and the circumferential surface thereof;

said linkage being rotatably connected to said second deburring roller between the center thereof and the circumferential surface thereof;

said linkage being selectively movable between first and second positions with respect to said support frame;

an actuator connected to said linkage for moving said link between its said first and second positions;

said first and second deburring rollers having the milled surfaces thereof facing one another, when said linkage is in its said first position, to permit the positioning of the wires and burr thereon between said first and second deburring rollers;

the movement of said linkage from its said first position to its said second position, when the wires and burr thereon are positioned between the milled surfaces, causing said first and second deburring rollers to rotate, thereby causing the circumferential surfaces on said first and second rollers, adjacent said milled surfaces thereon, to move into engagement with the burr to rollout the burr to create a substantially smooth, cylindrical surface where the burr was located;

the movement of said linkage from its said second position to its said first position, after the burr has been rolled out, causing said milled surfaces to again face one another to permit the deburred wire to be removed from between said first and second deburring rollers;

one of said rollers having a narrower width than the other roller.

* * * * *